United States Patent [19]

Shimura et al.

[11] Patent Number: 5,272,339
[45] Date of Patent: Dec. 21, 1993

[54] METHOD FOR ADJUSTING CONDITIONS IN RADIATION IMAGE RECORDING, READOUT, AND REPRODUCING SYSTEMS

[75] Inventors: Kazuo Shimura, Kanagawa; Takefumi Nagata, Tokyo; Hiroshi Tanaka, Tokyo; Kazuhiro Hishinuma, Tokyo; Shoji Hara; Hideya Takeo, both of Kanagawa, all of Japan

[73] Assignee: Fuji Photo Film Co., Ltd., Kanagawa, Japan

[21] Appl. No.: 718,533

[22] Filed: Jun. 19, 1991

[30] Foreign Application Priority Data

Jun. 20, 1990 [JP] Japan ............... 2-161594
Sep. 20, 1990 [JP] Japan ............... 2-250881

[51] Int. Cl.⁵ ............................ G01N 23/04
[52] U.S. Cl. ............................ 250/584
[58] Field of Search ............. 250/327.2, 484.1

[56] References Cited

U.S. PATENT DOCUMENTS

| | | | |
|---|---|---|---|
| 4,236,078 | 11/1980 | Kotera et al. | 250/327.2 |
| 4,258,264 | 3/1981 | Kotera et al. | 250/327.2 |
| 4,276,473 | 6/1981 | Kato et al. | 250/327.2 |
| 4,315,318 | 2/1982 | Kato et al. | 250/337 |
| 4,346,295 | 8/1982 | Tanaka et al. | 250/327.2 |
| 4,387,428 | 6/1983 | Ishida et al. | 250/337 |
| 4,527,060 | 7/1985 | Suzuki et al. | 250/327.2 |
| 4,861,993 | 8/1989 | Adachi et al. | 250/327.2 |
| 4,914,295 | 4/1990 | Shimura et al. | 250/327.2 |
| 4,943,723 | 7/1990 | Adachi et al. | 250/327.2 |
| 4,955,067 | 9/1990 | Shimura | 250/327.2 |
| 4,977,504 | 12/1990 | Funahashi | 250/327.2 |
| 4,983,835 | 1/1991 | Takeo | 250/327.2 |
| 4,992,663 | 2/1991 | Takeo | 250/327.2 |
| 4,999,497 | 3/1991 | Funahashi et al. | 250/327.2 |
| 5,157,733 | 10/1992 | Takeo et al. | 382/6 |

FOREIGN PATENT DOCUMENTS 0021342 4/1983 European Pat. Off.
56-11395 2/1981 Japan.
61-5193 2/1986 Japan.

OTHER PUBLICATIONS

Rumelhart, et al, "Learning Representations by Back-Propagating Errors", Nature, 323-9, 533-356 (1986).
Aso, "Back-Propagation", Computrol No. 24, pp. 53-60.
Aihara, "Nueral Computer", Tokyo Denki University.

Primary Examiner—Carolyn E. Fields
Assistant Examiner—Drew A. Dunn
Attorney, Agent, or Firm—Sughrue, Mion, Zinn, Macpeak & Seas

[57] ABSTRACT

A method for adjusting conditions comprises the steps of, when a radiation image of a specific object is recorded and read out, investigating whether recording and read-out operations were or were not carried out in the past for the same object as the specific object. When recording and read-out operations were carried out in the past for the same object as the specific object, image recording conditions for the specific object are adjusted such that they coincide with those under which the recording operation was carried out for the same object as the specific object. Also, instead of read-out conditions for a final readout, which is to be carried out for the specific object, being adjusted on the basis of a preliminary read-out image signal representing the radiation image of the specific object, the read-out conditions for the final readout to be carried out for the specific object are adjusted such that they coincide with those under which the final readout was carried out from the radiation image of the same object as the specific object. Recording and read-out operations for the specific object are carried out under the conditions, which have thus been adjusted.

18 Claims, 8 Drawing Sheets

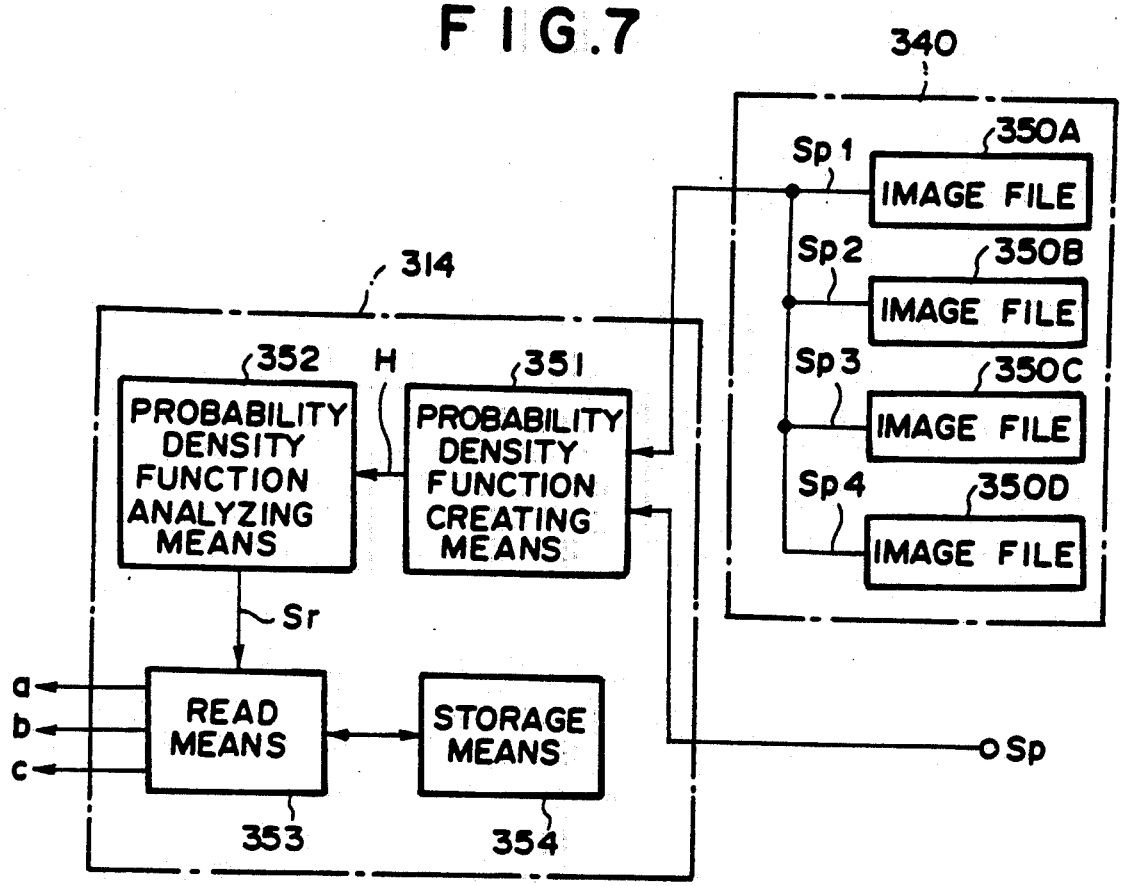
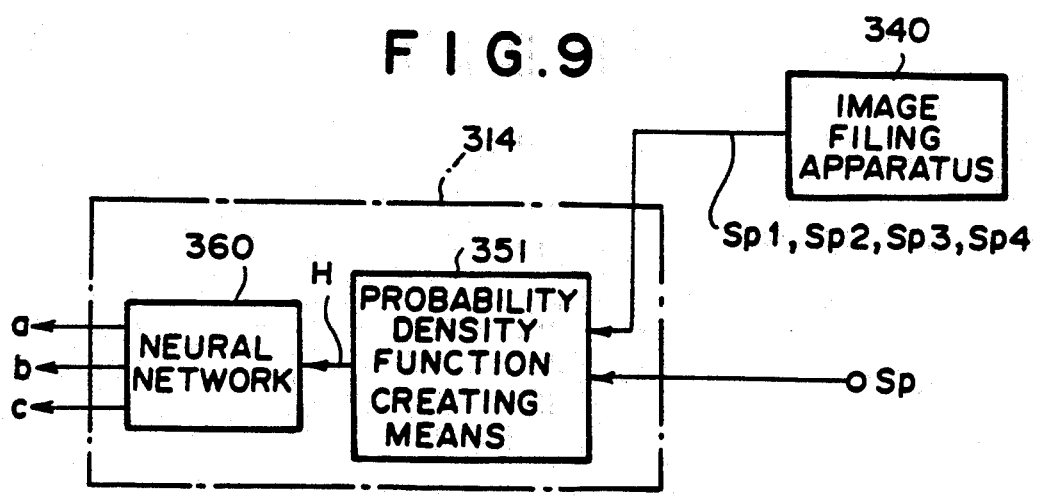

METHOD FOR ADJUSTING CONDITIONS IN RADIATION IMAGE RECORDING, READOUT, AND REPRODUCING SYSTEMS

BACKGROUND OF THE INVENTION

1. Field of the Invention

This invention relates to a method for adjusting conditions in a radiation image recording, read-out, and reproducing system wherein a radiation image is recorded on a recording medium, such as a stimulable phosphor sheet or X-ray film, the radiation image is then read out from the recording medium, an image signal representing the radiation image being thereby obtained, and a visible image is reproduced from the image signal.

2. Description of the Prior Art

Techniques for recording a radiation image on a recording medium, reading out the recorded radiation image in order to obtain an image signal, carrying out appropriate image processing on the image signal, and then reproducing a visible image by use of the processed image signal have heretofore been known in various fields. For example, as disclosed in Japanese Patent Publication No. 61(1986)-5193, an X-ray image is recorded on an X-ray film having a small gamma value chosen according to the type of image processing to be carried out, the X-ray image is read out from the X-ray film and converted into an electric signal (image signal), and the image signal is processed and then used for reproducing the X-ray image as a visible image on a copy photograph, or the like. In this manner, a visible image having good image quality with high contrast, high sharpness, high graininess, or the like can be reproduced.

Also, when certain kinds of phosphors are exposed to radiation such as X-rays, α-rays, β-rays, γ-rays, cathode rays or ultraviolet rays, they store part of the energy of the radiation. Then, when the phosphor which has been exposed to the radiation is exposed to stimulating rays such as visible light, light is emitted by the phosphor in proportion to the amount of energy stored thereon during its exposure to the radiation. A phosphor exhibiting such properties is referred to as a stimulable phosphor.

As disclosed in U.S. Pat. Nos. 4,258,264, 4,276,473, 4,315,318, 4,387,428, and Japanese Unexamined Patent Publication No. 56(1981)-11395, it has been proposed to use stimulable phosphors in radiation image recording and reproducing systems. Specifically, a sheet provided with a layer of the stimulable phosphor (hereinafter referred to as a stimulable phosphor sheet) is first exposed to radiation which has passed through an object, such as the human body. A radiation image of the object is thereby stored on the stimulable phosphor sheet. The stimulable phosphor sheet is then scanned with stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. The image signal is then used during the reproduction of the radiation image of the object as a visible image on a recording material such as photographic film, on a display device such as a cathode ray tube (CRT) display device, or the like.

Radiation image recording and reproducing systems which use stimulable phosphor sheets are advantageous over conventional radiography using silver halide photographic materials, in that images can be recorded even when the energy intensity of the radiation to which the stimulable phosphor sheet is exposed varies over a wide range. More specifically, since the amount of light which the stimulable phosphor sheet emits when being stimulated varies over a wide range and is proportional to the amount of energy stored thereon during its exposure to the radiation, it is possible to obtain an image having a desirable density regardless of the energy intensity of the radiation to which the stimulable phosphor sheet was exposed. In order to obtain the desired image density, an appropriate read-out gain is set when the emitted light is being detected and converted into an electric signal to be used in the reproduction of a visible image on a recording material, such as photographic film, or on a display device, such as a CRT display device.

In order ultimately to obtain a reproduced image having the best possible image quality, a novel radiation image recording and reproducing system has been proposed in, for example, U.S. Pat. No. 4,527,060. The proposed radiation image recording and reproducing system is constituted such that a preliminary read-out operation (hereinafter simply referred to as the "preliminary readout") is carried out. In the preliminary read-out, a stimulable phosphor sheet on which a radiation image has been stored is exposed to a light beam having a comparatively low energy level, which releases part of the energy stored on the stimulable phosphor sheet when it was exposed to radiation. A preliminary read-out image signal is obtained from the preliminary read-out. From the preliminary read-out image signal, information is ascertained about the radiation which was irradiated onto the stimulable phosphor sheet. Such information might indicate, for example, the energy intensity and dynamic range of the radiation. Thereafter, a final read-out operation (hereinafter simply referred to as the "final readout") is carried out. In the final readout, the stimulable phosphor sheet is exposed to a light beam having an energy level higher than the energy level of the light beam used in the preliminary readout. When the stimulable phosphor sheet is exposed to a light beam in the final readout, an image signal is obtained, which image signal is to be used in the reproduction of a visible image. Read-out conditions for the final readout and/or image processing conditions, under which the image signal obtained during the final readout is to be image processed, are adjusted automatically on the basis of the information ascertained from the preliminary read-out image signal.

The term "read-out conditions" as used herein means a group of various factors, which are adjustable and which affect the values of the image signal obtained during the final readout. The image signal in turn affects the gradation and sensitivity of the visible image which is reproduced. For example, the term "read-out conditions" may refer to a read-out gain, a scale factor, or the power of the source producing the light beam used during the final readout. Also, the term "image processing conditions" as used herein means a group of various factors which are adjustable and which affect how an image is processed, which in turn affects the gradation and sensitivity of the reproduced visible image. For example, the term "image processing conditions" may refer to the scale used in the conversion of an image signal.

The term "energy level of a light beam" as used herein means the level of energy of the light beam to which the stimulable phosphor sheet is exposed per unit area. In cases where the energy of the light emitted by the stimulable phosphor sheet depends on the wavelength of the irradiated light beam. i.e. the sensitivity of the stimulable phosphor sheet to the irradiated light beam depends upon the wavelength of the irradiated light beam, the term "energy level of a light beam" means the weighted energy level which is calculated by weighting the energy level of the light beam, to which the stimulable phosphor sheet is exposed per unit area, with the sensitivity of the stimulable phosphor sheet to the wavelength. In order to change the energy level of a light beam, light beams of different wavelengths may be used, the intensity of the light beam produced by a laser beam source or the like may be changed, or the intensity of the light beam may be changed by moving an ND filter or the like into and out of the optical path of the light beam. Alternatively, the diameter of the light beam may be changed in order to alter the scanning density, or the speed at which the stimulable phosphor sheet is scanned with the light beam may be changed.

Regardless of whether the preliminary readout is or is not carried out, it has also been proposed to analyze the image signal (or the preliminary read-out image signal) obtained and to adjust the image processing conditions, which are to be used when the image signal is processed, on the basis of the results of an analysis of the image signal. The proposed method is applicable to cases where an image signal is obtained from a radiation image recorded on a recording medium such as conventional X-ray film, as well as to systems using stimulable phosphor sheets.

In the aforesaid radiation image recording and reproducing systems, the read-out conditions for the final readout and/or the image processing conditions are adjusted such that each reproduced visible image has the best possible quality. Therefore, with the aforesaid radiation image recording and reproducing systems, each reproduced image is suitable for viewing. However, in cases where different read-out conditions for the final readout and/or different image processing conditions are used when an image is reproduced, a change in the image density in, for example, an image of an object which was recorded in the past and an image which represents the current state of the same object cannot be ascertained accurately when the two images are compared with each other.

An example of the aforesaid problem will be described hereinbelow with reference to FIGS. 3A, 3B, 4A, and 4B.

FIG. 3A is a schematic view showing a radiation image 6 of part (in this case, the frontal chest) of a human body, which image has been reproduced on a sheet of photographic film 5. A portion 6b in the radiation image 6 represents a part of the chest not affected by disease and has an approximately uniform level of image density, whereas a portion 6a represents a part of the chest affected by disease and has a level of image density lower than the image density at the portion 6b.

FIG. 3B is a graph showing the change in the abnormal level of image density at the portion 6a representing a part of the chest affected by disease, which change was investigated by recording and reproducing a plurality of radiation images of the object shown in FIG. 3A over a period of time. The disease is becoming less severe as time passes. Curve A indicates the ideal levels of image density in the reproduced image of the portion 6a as the disease becomes less severe over time. However, in cases where the image readout and/or the image processing is carried out such that each of the reproduced images has the best possible quality, abnormal levels of image density in the reproduced image of the portion 6a are often represented by curve B. The severity of the disease is judged on the basis of the difference between the image density of the part of the reproduced image corresponding to the portion 6a and the image density of the part of the reproduced image corresponding to the portion 6b. Specifically, from an image which was recorded at time T1, the image density difference $\Delta D1$ between the normal level of image density and the level of image density on curve A should be detected. The image density difference $\Delta D1$ is large and indicates that the part of the chest represented by the portion 6a has been severely affected by disease. However, there is a risk that the image density difference $\Delta D1'$ between the normal level of image density and the level of image density on curve B will be detected. The image density difference $\Delta D1'$ is small and indicates that the disease is not very severe. Also, from an image which was recorded at time T2, the image density difference $\Delta D2$ ($\Delta D2 < \Delta D1$) between the normal level of image density and the level of image density on curve B should be detected. However, there is a risk that the image density difference $\Delta D2'$ ($\Delta D2' > \Delta D1'$) between the normal level of image density and the level of image density on curve B will be detected. At time T2, the disease has actually become somewhat less severe than it was at time T1, i.e. $\Delta D2 < \Delta D1$. However, there is a risk that the disease will be judged as being more serious than it was at time T1, i.e. $\Delta D2' > \Delta D1'$.

FIG. 4A is a schematic view showing a radiation image 6' of part (in this case, the sides of the vertebrae) of a human body, which image has been reproduced on a sheet of photographic film 5'. In cases where a disease is diagnosed which causes the level of image density at bone portions 6a', 6a', . . . in the radiation image 6' to increase, a judgment about the progression of the disease must be made on the basis of the image density at the bone portions 6a', 6a', . . . This is because, unlike the case shown in FIG. 3A, the bone portions 6a', 6a', . . . and a portion 6b' are images of different organs, and the difference in image density therebetween cannot be utilized to make a judgment.

However, when a plurality of reproduced images such as those shown in FIG. 4A are obtained, the readout conditions for the final readout and/or the image processing conditions are generally adjusted so that the image density of the bone portions 6a', 6a', . . . is constant in the reproduced images.

FIG. 4B is a graph showing the change in the abnormal levels of image density at the bone portions 6a', 6a', . . . , which change was investigated by recording and reproducing a plurality of radiation images such as those shown in FIG. 4A over a period of time. As in the case shown in FIG. 3B, the disease is becoming less severe with the passage of time. Curve A' indicates the ideal levels of image density in the reproduced images of the bone portions 6a', 6a', . . . as the disease becomes less severe. However, in cases where the image readout and/or the image processing is carried out such that the levels of the image density in the reproduced images are identical at the bone portions 6a', 6a', . . . , the image density at the bone portions 6a', 6a', . . . follows curve B' and is approximately the same as the level of image density in a reproduced image of bone portions not affected by disease. In this case, any abnormality in the image density in the reproduced images of the bone portions 6a', 6a', . . . cannot be detected.

In order for the aforesaid problems to be eliminated, a novel method has been proposed in U.S. Pat. No. 4,999,497. With the proposed method, when each of a plurality of radiation images of an object is recorded, an image of a step wedge comprising a plurality of steps whose transmittances with respect to radiation vary stepwise is recorded together with the image of the object. When a radiation image, which is to be compared with a radiation image recorded in the past, is currently read out, processed, and reproduced as a visible image, the read-out conditions for the final readout and/or the image processing conditions are adjusted such that the image density of the part of a currently reproduced image corresponding to each step of the step wedge may become identical with the image density of the part of a past reproduced image corresponding to the corresponding step of the step wedge. However, with this proposed method, it is necessary for the same step wedge to be always recorded together with the object. Therefore, considerable time and labor are required to manage the step wedge, and the image recording efficiency cannot be kept high. Also, when the read-out conditions for the final readout and/or the image processing conditions are adjusted on the basis of the image signal (or the preliminary read-out image signal) detected from a radiation image, image signal components of the image signal corresponding to the image of the step wedge must be extracted from the image signal. Thereafter, the read-out conditions for the final readout and/or the image processing conditions must be adjusted on the basis of the values of the image signal components corresponding to each step of the step wedge. Therefore, complicated operations are required to adjust the read-out conditions for the final readout and/or the image processing conditions.

SUMMARY OF THE INVENTION

The primary object of the present invention is to provide a method for adjusting conditions in a radiation image recording, read-out, and reproducing system, in which a step wedge need not be used for reference but with which necessary conditions can be adjusted such that a reproduced image capable of being appropriately compared with a past reproduced image may be obtained.

Another object of the present invention is to provide a method for setting read-out conditions and/or image processing conditions for a radiation image, wherein a plurality of radiation images of an object, which have been recorded at certain time intervals and which are to be used in finding a change in the state of the same object with the passage of time, can be reproduced as visible images such that a large amount of variation in image density may not occur between the visible images.

A first method for adjusting conditions in accordance with the present invention is applicable when a stimulable phosphor sheet is used and the preliminary readout is carried out.

Specifically, the present invention provides, in a radiation image recording, read-out, and reproducing system for:

i) carrying out a radiation image recording operation, wherein radiation is irradiated to an object, and a stimulable phosphor sheet is exposed to the radiation, which has passed through the object, a radiation image of the object being thereby stored on the stimulable phosphor sheet, ii) carrying out an image read-out operation, wherein:

a first image signal representing the radiation image of the object is obtained from a preliminary readout for exposing the stimulable phosphor sheet, on which the radiation image has been stored, to stimulating rays, which cause the stimulable phosphor sheet to emit light in proportion to the amount of energy stored thereon during its exposure to radiation, the emitted light being detected, and a second signal representing the radiation image is thereafter obtained from a final readout for again exposing the stimulable phosphor sheet to stimulating rays, the light emitted by the stimulable phosphor sheet being detected, read-out conditions for the final readout being adjusted on the basis of the first image signal, iii) when necessary, carrying out image processing on the second image signal, which has been obtained from the final readout, and iv) reproducing a visible image from the second image signal, which has been or has not been image processed, a method for adjusting conditions, in which image recording conditions for the radiation image recording operation and the read-out conditions for the final readout are adjusted, the method for adjusting conditions comprising the steps of:

a) storing information representing the image recording conditions, under which radiation image recording operations were carried out in the past, information giving specifics about the corresponding objects, for which the radiation image recording operations were carried out, and information representing the corresponding read-out conditions for final readouts in image read-out operations carried out in the past, these pieces of information being stored in a storage means, b) when a radiation image recording operation and an image read-out operation are to be carried out for a specific object, investigating whether a radiation image recording operation and an image read-out operation were or were not carried out in the past for the same object as said specific object, and c) in cases where a radiation image recording operation and an image read-out operation were carried out in the past for the same object as said specific object, adjusting image recording conditions for said specific object such that the conditions coincide with the image recording conditions under which the radiation image recording operation was carried out for the same object as said specific object, adjusting the read-out conditions for the final readout, which is to be carried out for said specific object, such that the conditions coincide with the readout conditions, under which the final readout was carried out in the past for the same object as said specific object, the read-out conditions being obtained from the information stored in said storing step, and carrying out a radiation image recording operation and an image read-out operation for said specific object under the conditions, which have thus been adjusted.

A second method for adjusting conditions in accordance with the present invention is applicable when a recording medium, such as a stimulable phosphor sheet or X-ray film, which is capable of recording a radiation image thereon, is used.

Specifically, the present invention also provides, in a radiation image recording, read-out, and reproducing system for:

i) carrying out a radiation image recording operation, wherein radiation is irradiated to an object, and a recording medium is exposed to the radiation, which has passed through the object, a radiation image of the object being thereby recorded on the recording medium, ii) carrying out an image read-out operation, wherein the radiation image, which has been recorded on the recording medium, is photoelectrically read out, and an image signal representing the radiation image of the object is thereby obtained, the image signal being made up of a series of image signal components, iii) carrying out a normalizing operation, wherein only image signal components representing desired image information are extracted from the image signal, which has been obtained from the image read-out operation, normalizing conditions for the normalizing operation being adjusted on the basis of the image signal, which has been obtained from the image read-out operation, iv) when necessary, carrying out image processing on the image signal components, which have been obtained from the normalizing operation, and v) reproducing a visible image from the image signal components, which have been or have not been image processed, a method for adjusting conditions, in which image recording conditions for the radiation image recording operation and the normalizing conditions for the normalizing operation are adjusted, the method for adjusting conditions comprising the steps of:

a) storing information representing the image recording conditions, under which radiation image recording operations were carried out in the past, information giving specifics about the corresponding objects, for which the radiation image recording operations were carried out, and information representing the corresponding normalizing conditions for normalizing operations carried out in the past, these pieces of information being stored in a storage means, b) when a radiation image recording operation, an image read-out operation, and a normalizing operation are to be carried out for a specific object, investigating whether a radiation image recording operation, an image read-out operation, and a normalizing operation were or were not carried out in the past for the same object as said specific object, and c) in cases where a radiation image recording operation, an image read-out operation, and a normalizing operation were carried out in the past for the same object as said specific object, adjusting image recording conditions for said specific object such that the conditions coincide with the image recording conditions under which the radiation image recording operation was carried out for the same object as said specific object, adjusting the normalizing conditions for the normalizing operation, which is to be carried out for said specific object, such that the conditions coincide with the normalizing conditions under which the normalizing operation was carried out in the past on the image signal representing the radiation image of the same object as said specific object, and carrying out a radiation image recording operation, an image read-out operation, and a normalizing operation for said specific object under the conditions, which have thus been adjusted.

In the first and second methods for adjusting conditions in accordance with the present invention, the storage means may collectively store the information giving specifics about many objects. Alternatively, the storage means may be composed of a plurality of different and independent storage media. In cases where the storage means is composed of a plurality of different and independent storage media, different storage media should preferably be prepared for different names of objects, which are one of the information giving specifics about objects.

With the first method for adjusting conditions in a radiation image recording, read-out, and reproducing system in accordance with the present invention, wherein a preliminary readout is carried out, the image recording conditions and the read-out conditions for the final readout, which are to be employed for a specific object, are adjusted such that the conditions coincide with those which were employed for a radiation image of the same object as the specific object, which image was obtained in the past. Also, with the second method for adjusting conditions in a radiation image recording, read-out, and reproducing system in accordance with the present invention, wherein a preliminary readout is not carried out, the image recording conditions and the normalizing conditions, which are to be employed for a specific object, are adjusted such that the conditions coincide with those which were employed for a radiation image of the same object as the specific object, which image was obtained in the past. Therefore, with the first and second methods for adjusting conditions in accordance with the present invention, a step wedge need not be used for reference, but necessary conditions can be adjusted such that a reproduced image capable of being appropriately compared with a past reproduced image can be obtained.

As described above, the storage means may be composed of a plurality of different and independent storage media, and information about past images corresponding to different names of objects may be stored on different storage media. In such cases, the storage device need not have a large storage capacity, and the number of on-line signal transmitting operations can be kept small. Therefore, the configuration of the apparatus for carrying out the method for adjusting conditions can be kept simpler than when many pieces of information about past images are collectively stored on the storage means by using a hard disk drive unit, or the like. In cases where many pieces of information about past images are collectively stored on the storage means, the problem can be prevented from occurring in that, for example, one or some of a plurality of storage media are lost.

A third method, i.e. a method for setting read-out conditions and/or image processing conditions for a radiation image, in accordance with the present invention is applicable when a stimulable phosphor sheet is used and the preliminary readout is carried out.

Specifically, the present invention further provides a method for setting read-out conditions and/or image processing conditions for a radiation image, wherein:

before a final readout is carried out in which a stimulable phosphor sheet having a radiation image stored thereon is exposed to stimulating rays, which cause the stimulable phosphor sheet to emit light in proportion to the amount of energy stored thereon during its exposure to radiation, the emitted light being detected by a photoelectric read-out means, and an image signal is thereby obtained from which a visible image is to be reproduced, a preliminary readout is carried out by using stimulating rays having an energy level lower than the energy level of the stimulating rays used in the final readout, and read-out conditions for the final readout and/or image processing conditions are set on the basis of characteristics of image input information on the stimulable phosphor sheet, which image input information has been obtained from the preliminary readout, wherein the improvement comprises the steps of:

i) carrying out preliminary readouts from all of a plurality of stimulable phosphor sheets, on each of which stimulable phosphor sheets one radiation image of the same object has been stored, said radiation images being used in finding a change in the state of the same object with the passage of time, and ii) for each of the plurality of said stimulable phosphor sheets, setting read-out conditions for the final readout and/or image processing conditions on the basis of characteristics of image input information on each said stimulable phosphor sheet and characteristics of image input information on at least one stimulable phosphor sheet, on which a radiation image was stored before a radiation image was stored on each said stimulable phosphor sheet.

Characteristics of the image input information depend on the conditions under which a radiation image is stored on a stimulable phosphor sheet, such as the level of the radiation dose used when the image was recorded, on the image input pattern, which is determined by what portion of an object (e.g. the chest or the abdomen of a human body) is recorded, and on the image recording method used, such as plain image recording or contrasted image recording.

With the third method in accordance with the present invention, the read-out conditions for the final readout (such as a read-out gain or a scale factor) and/or the image processing conditions are set for each of the stimulable phosphor sheets in the manner described above. Therefore, even if the image recording conditions vary for different stimulable phosphor sheets, a plurality of radiation images of an object, which have been recorded at certain time intervals and which are to be used in finding a change in the state of the same object with the passage of time, can be reproduced as visible images such that a large amount of variation in image density may not occur between the visible images. Also, the read-out conditions for the final readout and/or the image processing conditions for each stimulable phosphor sheet are set with the characteristics of the image input information on a different stimulable phosphor sheet being taken into consideration. As a result, the read-out conditions for the final readout and-/or the image processing conditions can be set to approximately uniform values for different stimulable phosphor sheets. Accordingly, the amount of variation in image density can be kept small for a plurality of the reproduced visible radiation images, which are to be used in finding a change in the state of the same object with the passage of time.

As described above, the third method in accordance with the present invention employs an intermediate technique between a method, with which the read-out conditions for the final readout and/or the image processing conditions are set independently for each of a plurality of stimulable phosphor sheets, and a method, with which the values of the read-out conditions for the final readout and/or the image processing conditions are fixed for a plurality of stimulable phosphor sheets. Therefore, with the third method in accordance with the present invention, regardless of which image recording conditions were employed, the amount of variation in image density can be kept small for a plurality of the reproduced visible radiation images, which are to be used in finding a change in the state of the same object with the passage of time.

A fourth method, i.e. a method for setting image processing conditions, in accordance with the present invention is applicable when a recording medium, such as a stimulable phosphor sheet or X-ray film, which is capable of recording a radiation image thereon, is used.

Specifically, the present invention still further provides a method for setting image processing conditions, wherein conditions, under which image processing is carried out on an image signal representing a radiation image, are set, the method for setting image processing conditions comprising the steps of:

in cases where a plurality of image signals are obtained, said image signals representing radiation images of the same object, which radiation images are to be used in finding a change in the state of the same object with the passage of time, for each of the plurality of said image signals, setting image processing conditions on the basis of each said image signal and at least one image signal representing a radiation image, which was recorded before a radiation image represented by each said image signal was recorded.

With the fourth method in accordance with the present invention, as with the third method in accordance with the present invention, regardless of which image recording conditions were employed, the amount of variation in image density can be kept small for a plurality of the reproduced visible radiation images, which are to be used in finding a change in the state of the same object with the passage of time.

Accordingly, with the third and fourth methods in accordance with the present invention, a plurality of radiation images, which are to be used in finding a change in the state of the same object with the passage of time, can be reproduced as visible images which have good image quality and can serve as effective tools in, particularly, the efficient and accurate diagnoses of diseases. From the visible images, the progression of a disease, or the like, can be found accurately.

BRIEF DESCRIPTION OF THE DRAWINGS

FIG. 7 is a block diagram showing an example of a means for setting read-out conditions and/or image processing conditions for a radiation image in the radiation image read-out and reproducing system of FIG. 5, FIG. 9 is a block diagram showing a different example of a means for setting read-out conditions and/or image processing conditions for a radiation image.

DESCRIPTION OF THE PREFERRED EMBODIMENTS

The present invention will hereinbelow be described in further detail with reference to the accompanying drawings.

Figure 1:
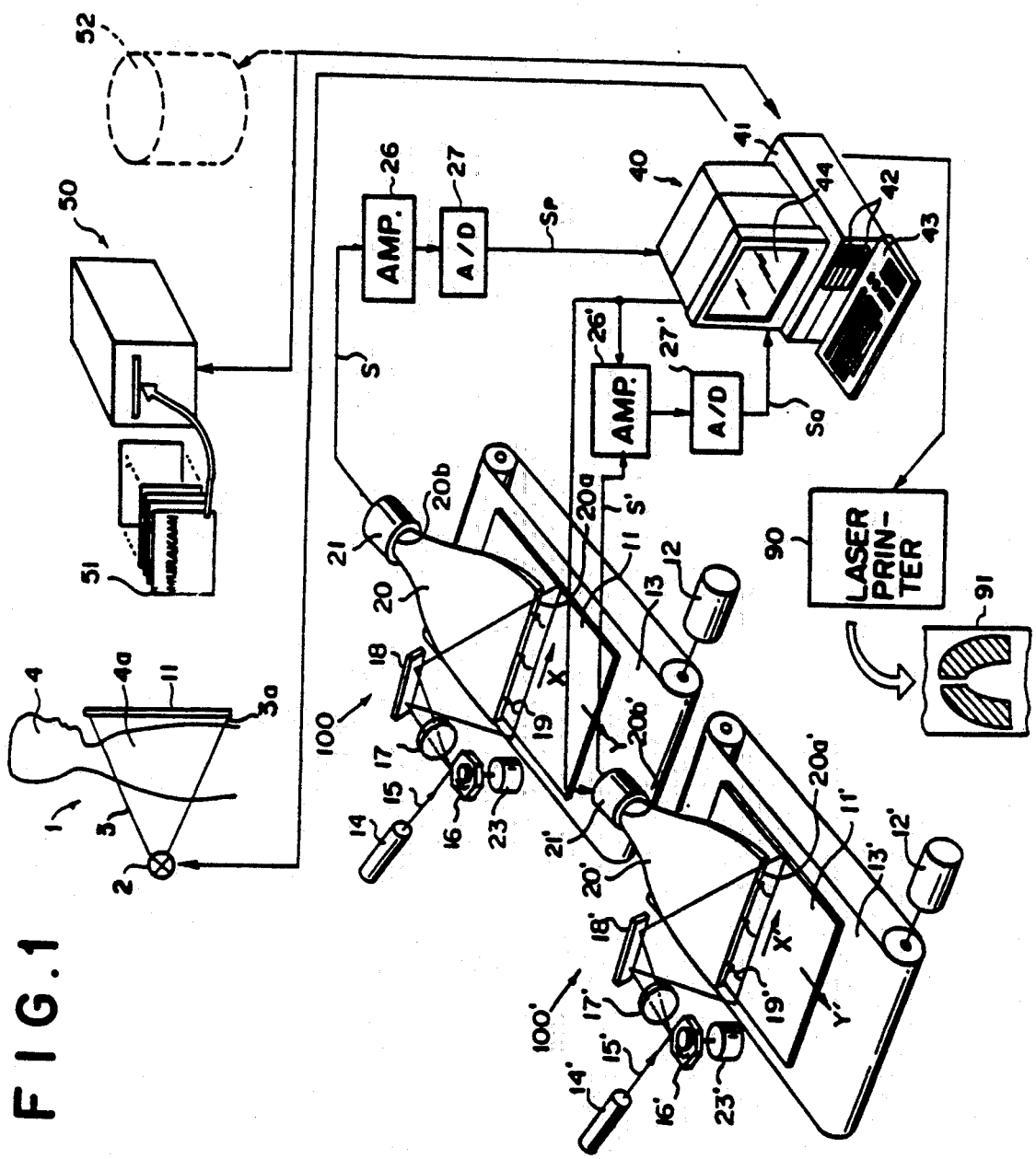
FIG. 1 is a schematic view showing an example of a radiation image recording and reproducing system, wherein an embodiment of the method for adjusting conditions in accordance with the present invention is employed.

FIG. 1 is a schematic view showing an example of a radiation image recording and reproducing system, wherein an embodiment of the method for adjusting conditions in accordance with the present invention is employed. In this embodiment, a stimulable phosphor sheet is used, and a preliminary readout is carried out.

With reference to FIG. 1, a memory card 51 is inserted into a card recording and reading device 50. By operating a keyboard 43 of a computer system 40, information, which has been recorded on the memory card 51 is read therefrom, or new information is recorded on the memory card 51. A plurality of memory cards are prepared for a plurality of patients (or names of objects). For a new patient, a new memory card 51 is inserted into the card recording and reading device 50.

When no information has been recorded on the memory card 51, it is found that the corresponding object is a new patient. Information giving specifics about an object, such as the name of the object, the sex of the object, the name of disease of the object, and the portion of the object the image of which is recorded, is entered from the keyboard 43. In cases where the object is a new patient, the entered information is recorded on the memory card 51. Also, image recording conditions, under which an X-ray image is recorded in an X-ray image recording apparatus 1, are determined on the basis of the entered information. The image recording conditions include, for example, the tube voltage of an X-ray tube 2 (which tube voltage determines the quality of X-rays) and the time for which X-rays are irradiated (which determines the dose of X-rays). In cases where the object is an old patient, the corresponding memory card 51 is inserted into the card recording and reading device 50. From the memory card 51, it is found that an image recording operation was carried out for the patient. For this patient, the same image recording conditions at those employed in the image recording operation carried out previously are set. In cases where the object is an old patient but a diagnosis is to be made for a disease different from that which was made previously, information representing that a diagnosis is to be made for a different disease is entered from the keyboard 43, and new image recording conditions are determined.

After the preparations described above are finished, an X-ray image of the object is recorded in the X-ray image recording apparatus 1. X-rays 3 are produced by an X-ray source 2 of the X-ray image recording apparatus 1 and irradiated to the chest 4a of a human body 4. X-rays 3a, which have passed through the human body 4, impinge upon a stimulable phosphor sheet 11. In this manner, an X-ray image of the chest 4a of the human body 4 is stored on the stimulable phosphor sheet 11.

The stimulable phosphor sheet 11, on which the X-ray image has been stored, is placed at a predetermined position in a preliminary read-out means 100 which carries out a preliminary readout by scanning the stimulable phosphor sheet 11 with a light beam having a low energy level, thereby releasing only part of the energy from the stimulable phosphor sheet 11, which energy was stored during its exposure to radiation. The stimulable phosphor sheet 11 is conveyed in a sub-scanning direction indicated by the arrow Y by a sheet conveyance means 13 which is constituted of an endless belt or the like and which is operated by a motor 12. A laser beam 15 which has a low energy level is produced by a laser beam source 14, and is reflected and deflected by a rotating polygon mirror 16 which is quickly rotated by a motor 23 in the direction indicated by the arrow. The laser beam 15 then passes through a converging lens 17 constituted of an $f\theta$ lens or the like. The direction of the optical path of the laser beam 15 is then changed by a mirror 18, and the laser beam 15 impinges upon the stimulable phosphor sheet 11 and scans it in a main scanning direction indicated by the arrow X, which direction is approximately normal to the sub-scanning direction indicated by the arrow Y. When the stimulable phosphor sheet 11 is exposed to the laser beam 15, the exposed portion of the stimulable phosphor sheet 11 emits light 19 in an amount proportional to the amount of energy stored thereon during its exposure to radiation. The emitted light 19 is guided by a light guide member 20 and photoelectrically detected by a photomultiplier 21. The light guide member 20 is made from a light guiding material such as an acrylic plate and has a linear light input face 20a, positioned so that it extends along the main scanning line on the stimulable phosphor sheet 11, and a ring-shaped light output face 20b, positioned so that it is in close contact with a light receiving face of the photomultiplier 21. The emitted light 19, which has entered the light guide member 20 at its light input face 20a, is guided through repeated total reflection inside of the light guide member 20, emanates from the light output face 20b, and is received by the photomultiplier 21. In this manner, the amount of the emitted light 19, which amount represents the X-ray image, is converted into an electric signal by the photomultiplier 21.

An analog output signal S generated by the photomultiplier 21 is logarithmically amplified by a logarithmic amplifier 26, and digitized by an A/D converter 27 into a preliminary read-out image signal SP. The preliminary read-out image signal SP takes a value proportional to the logarithmic value of the amount of the light 19, which was emitted from each of picture elements in the X-ray image stored on the stimulable phosphor sheet 11.

In the preliminary readout, read-out conditions, i.e. the voltage applied to the photomultiplier 21 and the amplification factor of the logarithmic amplifier 26, are adjusted so that image information can be detected accurately even if the amount of energy stored on the stimulable phosphor sheet 11 during its exposure to radiation varies over a wide range.

The preliminary read-out image signal SP obtained in the manner described above is fed into a computer system 40. The computer system 40 comprises a main body 41 in which a CPU and an internal memory are incorporated, a disk drive unit 42 which operates a floppy disk serving as a subsidiary memory, a keyboard 43 from which necessary instructions, or the like, are fed into the computer system 40, and a CRT display device 44 which displays necessary information.

In cases where the object (the patient in this case) has been found as being a new patient from the information, which has been entered from the card recording and reading device 50 into the computer system 40, the read-out conditions for the final readout, i.e. the sensitivity and the contrast during the final readout, are determined in the manner described later. By way of example, the voltage applied to a photomultiplier 21' and the amplification factor of a logarithmic amplifier 26' are controlled in accordance with the sensitivity and the contrast.

The contrast corresponds to the ratio of the largest amount of emitted light, which is capable of being accurately converted into an image signal during the final readout, to the smallest amount of emitted light, which is capable of being accurately converted into an image signal during the final readout. The sensitivity corresponds to the photoelectric conversion factor, which represents to what image signal level a predetermined amount of emitted light is to be converted.

Figure 2:
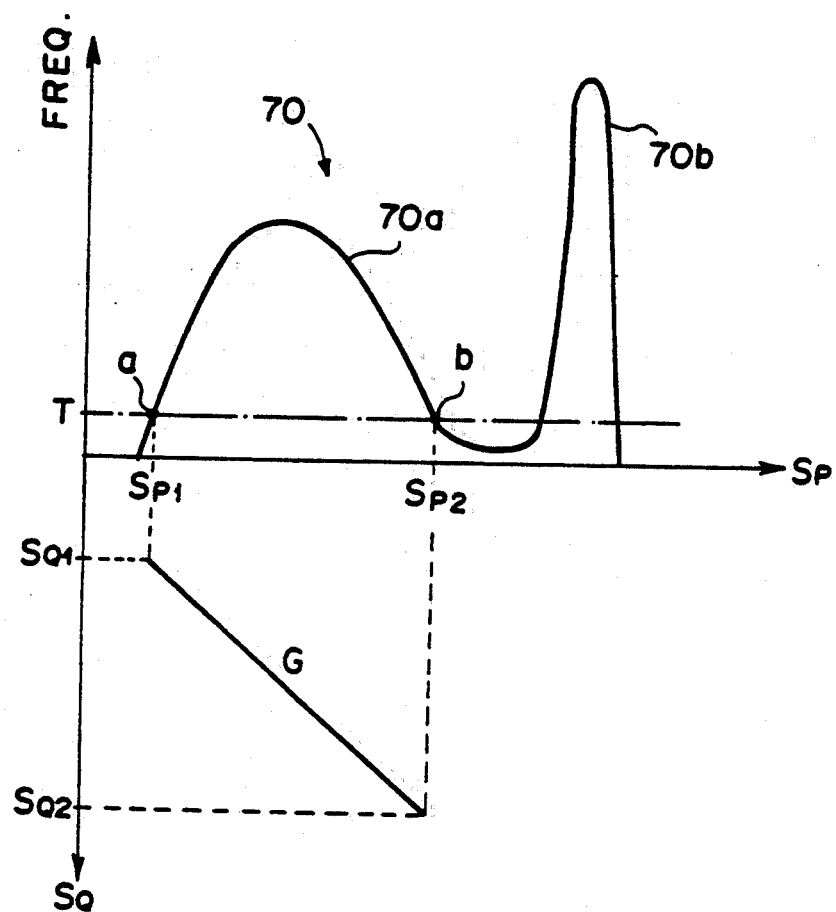
FIG. 2 is a graph showing an example of a probability density function of a preliminary read-out image signal.
Figure 3A:
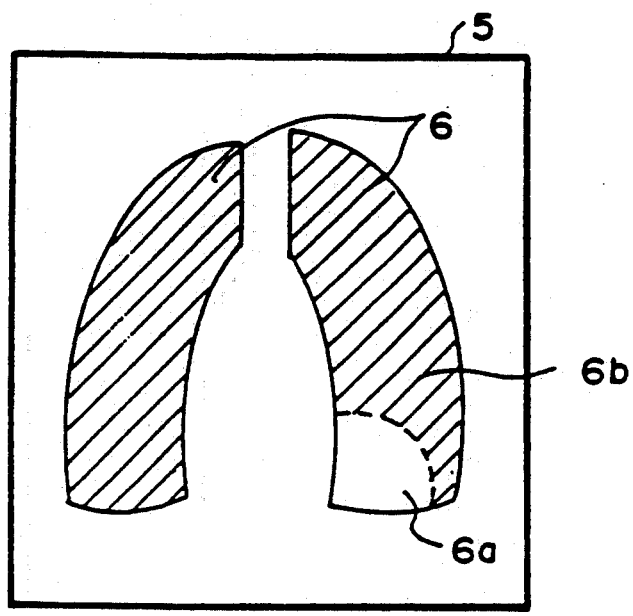
FIG. 3A is a schematic view showing a radiation image of part of a human body, which image has been reproduced and displayed.
Figure 3B:
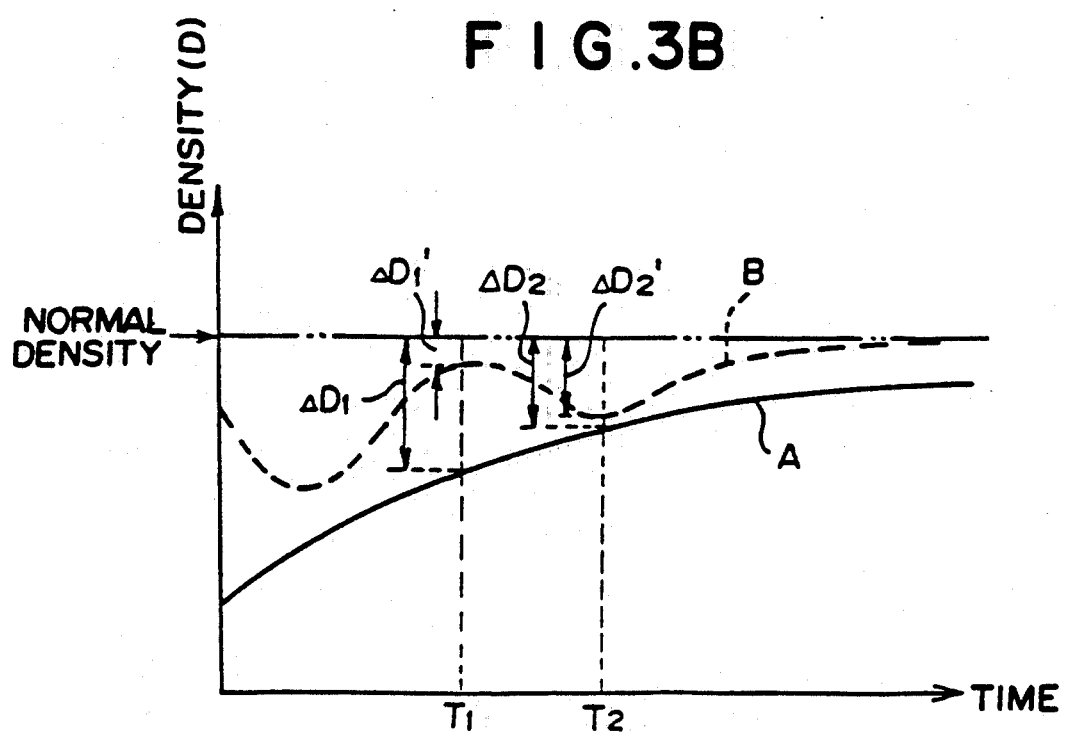
FIG. 3B is a graph showing the change in image density at part of the object shown in FIG. 3A, which change was investigated by recording and reproducing a plurality of radiation images of the object shown in FIG. 3A over a period of time.
Figure 4A:
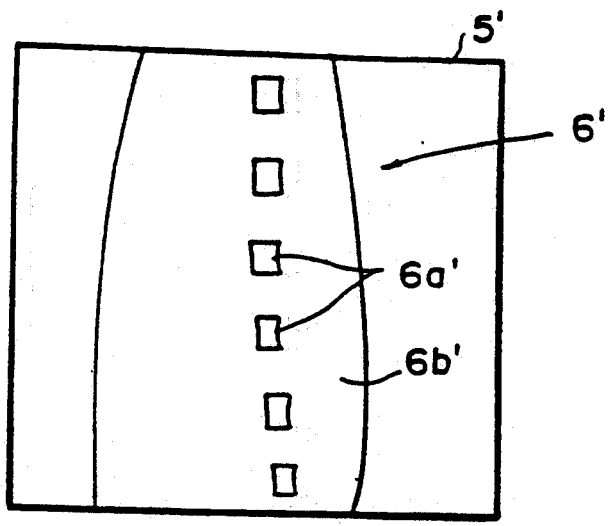
FIG. 4A is a schematic view showing a radiation image of part of a human body, which image has been reproduced and displayed.
Figure 4B:
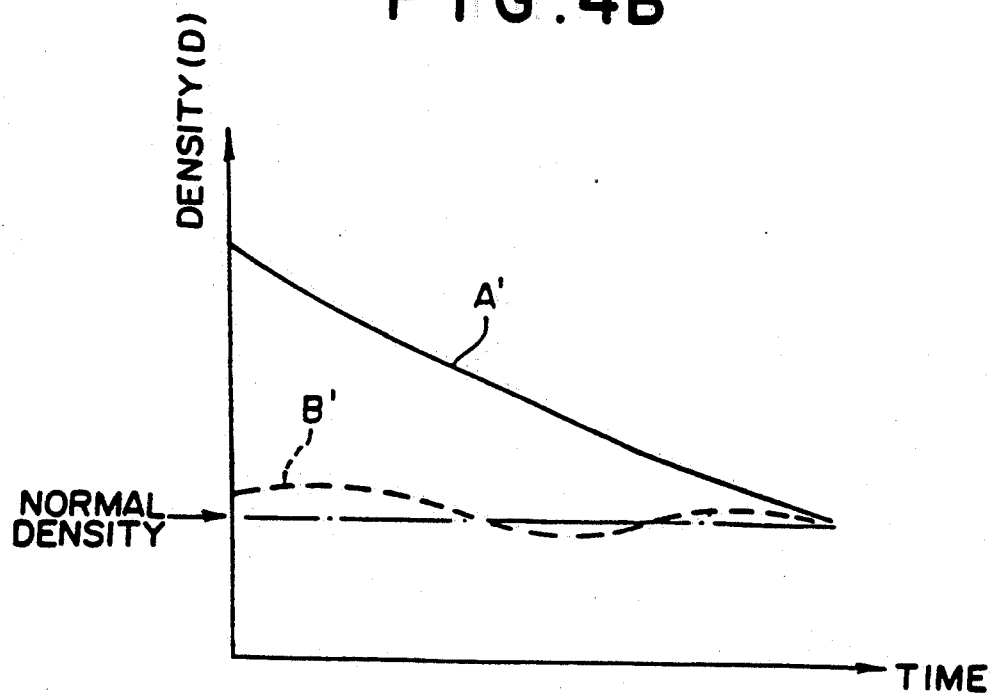
FIG. 4B is a graph showing the change in image density at part of the object shown in FIG. 4A, which change was investigated by recording and reproducing a plurality of radiation images of the object shown in FIG. 4A over a period of time.

FIG. 2 is a graph showing an example of a probability density function of a preliminary read-out image signal SP. With reference to FIG. 2, the values of the preliminary read-out image signal SP are plotted on the horizontal axis. The relative frequency of occurrence of the values of the preliminary read-out image signal SP is plotted on the vertical axis at the upper part of the graph, and the values of an image signal SQ, which is obtained during a final readout, are plotted on the vertical axis at the lower part of the graph. An example of how the read-out conditions for the final readout are adjusted will be described hereinbelow with reference to FIG. 2.

A probability density function 70 is composed of projecting parts 70a and 70b. The projecting part 70a represents the image signal components of the preliminary read-out image signal SP, which represent an object image. The projecting part 70b corresponds to a background region, upon which the X-rays impinged directly without passing through the object. Only the image signal components representing the object image need be obtained during the final readout. Therefore, the values of the probability density function 70 are compared to a threshold value T, starting with the value of the function at the minimum value of the preliminary read-out image signal SP (i.e. the left side of FIG. 2) and working along the direction of increase of the image signal values (i.e. toward the right side of FIG. 2). A point "a", at which the probability density function 70 crosses first through the threshold value T, is found. Also, a point "b", at which the probability density function 70 crosses second through the threshold value T, is found. Values SP1 and SP2 of the preliminary read-out image signal SP, which correspond to the points "a" and "b", respectively, are then found. The read-out conditions for the final readout are adjusted such that values SP1 and SP2 of the preliminary read-out image signal SP may be detected respectively as the minimum image signal value SQ1 and the maximum image signal value SQ2 in the final readout. Specifically, the read-out conditions for the final readout are adjusted such that, during the final readout, the image information represented by values of the emitted light signal falling within the range of SP1 to SP2 may be detected as an image signal with values lying on the straight line G shown in FIG. 2. Information representing the read-out conditions for the final readout, which have thus been adjusted, is recorded on the memory card 51 in the card recording and reading device 50.

In cases where the object is an old patient, instead of the read-out conditions for the final readout being adjusted on the basis of the preliminary read-out image signal SP in the manner described, information representing the read-out conditions for the final readout, which were employed when an X-ray image of the object recorded previously was read out, is read from the memory card 51.

The read-out conditions for the final readout are adjusted in the manner described above, or the information representing the read-out conditions for the final readout is read from the memory card 51. Thereafter, a stimulable phosphor sheet 11' on which the preliminary readout has been finished is placed at a predetermined position in the final read-out means 100' and scanned with a laser beam 15' having an energy level higher than that of the laser beam 15 used during the preliminary readout. In this manner, an image signal SQ is detected under the read-out conditions, which have been determined in the manner described above. The configuration of the final read-out means 100' is nearly the same as that of the preliminary read-out means 100, and therefore elements corresponding to those constituting the preliminary read-out means 100 are numbered with corresponding primed reference numerals in FIG. 1.

After the image signal is digitized in an A/D converter 27', the resulting image signal SQ is fed into the computer system 40, which carries out appropriate image processing on the image signal SQ. After being image processed, the image signal is fed into a laser printer 90, which reproduces a visible image on film 91 from the image signal.

In the embodiment described above, memory cards 51, 51, . . . are prepared, on which information about corresponding patients is recorded. In cases where an X-ray image of an old patient is recorded and read out, the image recording and read-out operations are carried out under the same image recording conditions and the same read-out conditions for the final readout as those which were employed during the image recording and read-out operations carried out for the same old patient. Therefore, a reproduced image can be obtained which is capable of being appropriately compared with a previously reproduced image. As for a new patient, the image recording conditions and the read-out conditions for the final readout are adjusted such that a reproduced image of the X-ray image of the new patient, which has best possible image quality, may be obtained.

In the aforesaid embodiment wherein a memory card 51 is prepared for each of patients, the storage device need not have a large storage capacity, and the number of on-line signal transmitting operations can be kept small. Therefore, the configuration of the apparatus for carrying out the method for adjusting conditions can be kept simple. However, in such cases, there is a risk that some of memory cards 51, 51, . . . are lost. Therefore, a storage device 52 having a large capacity, such as a hard disk drive unit, may be used, and many pieces of information about a plurality of patients may be managed collectively.

In the aforesaid embodiment, the preliminary read-out means 100 and the final read-out means 100' are separate from each other. Alternatively, because the configurations of the preliminary read-out means 100 and the final read-out means 100' are approximately identical to each other, a single read-out means may be utilized for performing both the preliminary readout and the final readout. In this case, after being subjected to the preliminary readout, the stimulable phosphor sheet 11 may be moved back to the position at which image readout is started. Thereafter, the final readout may be carried out.

In cases where a single read-out means is utilized to perform both the preliminary readout and the final readout, it is necessary to change the intensity of the light beam used in the preliminary readout and the final readout. For this purpose, various methods may be employed as described above, for example, a laser beam source or the like may change the intensity of the light beam.

In the aforesaid embodiment, the read-out conditions for the final readout are adjusted. Alternatively, predetermined read-out conditions may be used when the final readout is carried out regardless of the characteristics of the preliminary read-out image signal SP and the past image recording and read-out operations. As for a new patient, on the basis of the preliminary read-out image signal SP, the computer system 40 may adjust the normalizing conditions. Under the normalizing conditions, a normalizing operation is carried out wherein only the image signal components representing a desired object image are extracted from the image signal SQ and the extracted image signal components are normalized such that they are suitable to be sent to the laser printer 90. As for an old patient, information representing the corresponding normalizing conditions may be read from the corresponding memory card 51. As another alternative, the computer system 40 may manage both the read-out conditions and the normalizing conditions.

The aforesaid embodiment is applied to the radiation image recording and reproducing system wherein the preliminary readout is carried out. However, the method for adjusting conditions in accordance with the present invention is also applicable when no preliminary read-out operations are carried out, and only the aforesaid final read-out operations are carried out. In these cases, an image signal is obtained by use of predetermined read-out conditions. Based on the image signal, normalizing conditions are adjusted by the computer system 40. Also, information representing the normalizing conditions is recorded on a memory card 51 or read therefrom. A normalizing operation is carried out on the image signal under the adjusted normalizing conditions.

An embodiment of the method for setting read-out conditions and/or image processing conditions for a radiation image in accordance with the present invention will be described hereinbelow.

Figure 5:
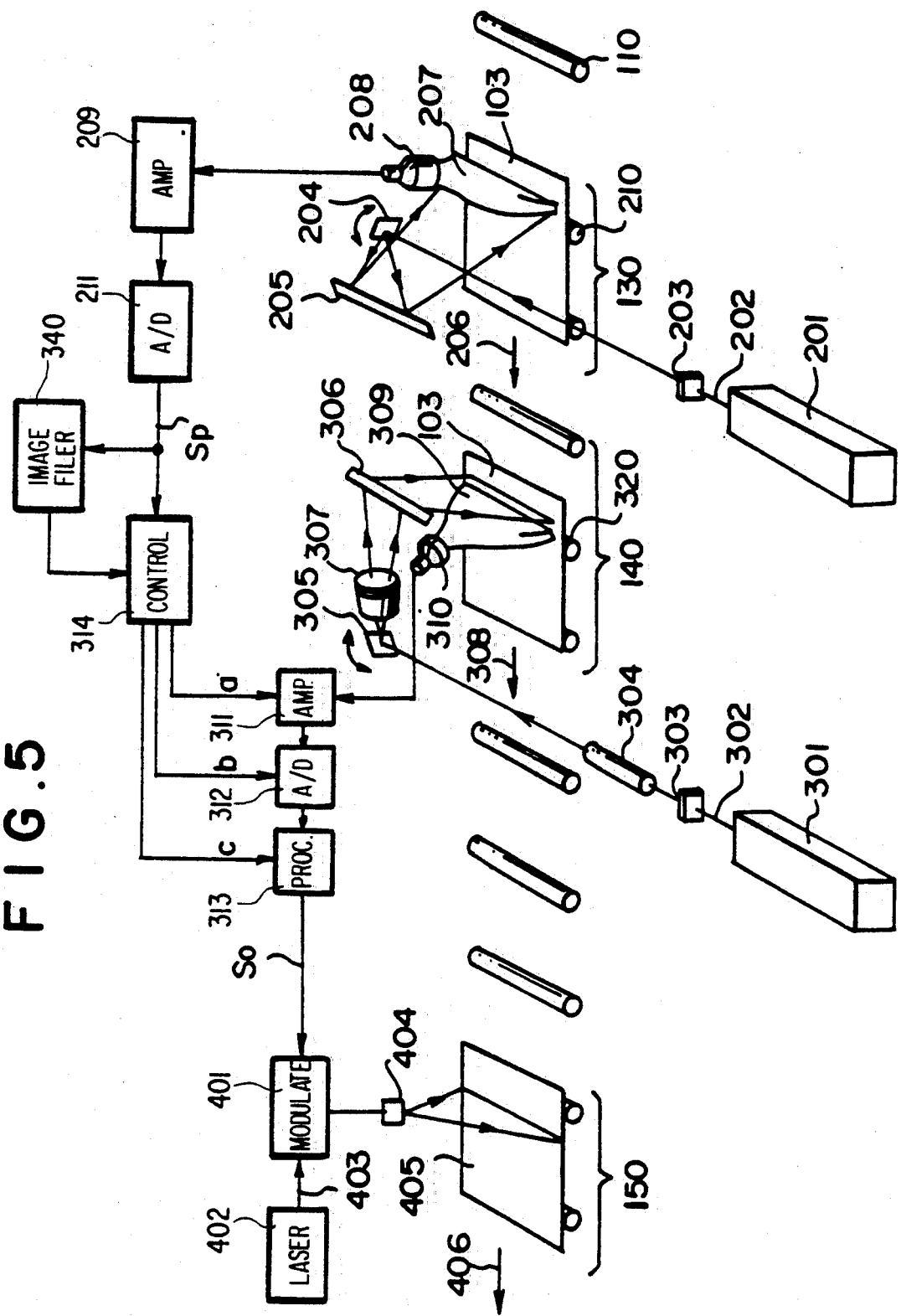
FIG. 5 is a schematic view showing an example of a radiation image read-out and reproducing system, wherein an embodiment of the method for setting read-out conditions and/or image processing conditions for a radiation image in accordance with the present invention is employed.
Figure 6:
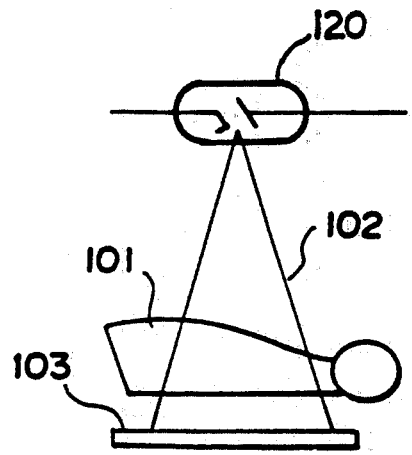
FIG. 6 is an explanatory view showing how a radiation image is recorded on a stimulable phosphor sheet.

FIG. 5 shows a radiation image read-out and reproducing system, wherein an embodiment of the method for setting read-out conditions and/or image processing conditions for a radiation image in accordance with the present invention is employed. FIG. 6 shows how a radiation image is recorded on a stimulable phosphor sheet.

As illustrated in FIG. 6, radiation 102 is produced by a radiation source 120, such as an X-ray tube. The radiation 102 is irradiated to an object 101. A stimulable phosphor sheet 103 is exposed to the radiation 102, which has passed through the object 101, and a radiation image of the object 101 is stored on the stimulable phosphor sheet 103.

In the radiation image read-out and reproducing system of FIG. 5, the radiation image is read out from the stimulable phosphor sheet 103. Examples of stimulable phosphors, which may be employed to constitute the stimulable phosphor sheet 103, are described in detail in, for example, U.S. Pat. No. 4,236,078 and European Patent No. 21,342.

The radiation image read-out and reproducing system of FIG. 5 comprises basically a preliminary read-out section 130, a final read-out section 140, and an image reproducing section 150. The stimulable phosphor sheet 103, on which the radiation image of the object 101 has been stored, is sent to the preliminary read-out section 130 by a sheet conveyance means 110, which may be constituted of a conveyor roller, or the like.

In the preliminary read-out section 130, a laser beam 202 is produced by a laser beam source 201. The laser beam 202 first passes through a filter 203, which filters out light having wavelengths within the range of wavelengths of the light emitted by the stimulable phosphor sheet 103 upon stimulation thereof by the laser beam 202. Then, the laser beam 202 is one-dimensionally deflected by a light deflector 204, such as a galvanometer mirror, and directed onto the stimulable phosphor sheet 103 by a plane reflection mirror 205. The laser beam source 201 is selected so that the laser beam 202 produced thereby has a wavelength distribution different from and far apart from the wavelength distribution of the light emitted by the stimulable phosphor sheet 103 when it is stimulated. While the laser beam 202 impinges upon the stimulable phosphor sheet 103, the stimulable phosphor sheet 103 is moved in the direction indicated by the arrow 206 (i.e. in the sub-scanning direction) by a sheet conveyance means 210, which may be constituted of conveyor rollers, or the like. In this manner, the overall surface of the stimulable phosphor sheet 103 is exposed to and scanned by the laser beam 202.

The power of the laser beam source 201, the beam diameter of the laser beam 202, the speed with which the laser beam 202 scans, and the speed at which the stimulable phosphor sheet 103 moves are selected so that the level of the stimulation energy of the laser beam 202 used during the preliminary readout is lower than the level of the stimulation energy of the laser beam used during the final readout carried out in the final read-out section 140.

When it is exposed to the laser beam 202 in the manner described above, the stimulable phosphor sheet 103 emits light in an amount proportional to the amount of energy stored thereon during its exposure to the radiation. The emitted light enters a light guide member 207, which may be of the shape and material disclosed in U.S. Pat. No. 4,346,295. The light is guided inside of the light guide member 207 through total reflection, emanates from a light output face of the light guide member 207 and is received by a photodetector 208, which may be constituted of a photomultiplier, or the like. The light receiving face of the photodetector 208 is positioned so that it is in close contact with a filter, which transmits only light having wavelengths within the range of wavelengths of light emitted by the stimulable phosphor sheet 103 and filters out light having wavelengths within the range of wavelengths of the stimulating rays. Therefore, the photodetector 208 detects only the light emitted by the stimulable phosphor sheet 103 upon stimulation thereof. The light detected by the photodetector 208 is converted into an electric signal carrying the image input information stored on the stimulable phosphor sheet 103, and amplified by an amplifier 209.

The signal generated by the amplifier 209 is digitized by an A/D converter 211, and sent as a preliminary read-out image signal SP to a final read-out control means 314 in the final read-out section 140. On the basis of the image input information, which is represented by a probability density function of the preliminary read-out image signal SP, the final read-out control means 314 adjusts a read-out gain setting value (a), a scale factor setting value (b), and an image processing condition setting value (c).

In cases where the radiation image, which was stored on the stimulable phosphor sheet 103, is one of the radiation images, which are to be used in finding a change in the state of the same object with the passage of time, the preliminary read-out image signal SP detected from the stimulable phosphor sheet 103 is stored on a recording medium, such as an optical disk or a magnetic disk, in an image filing apparatus 340.

After the preliminary readout from the stimulable phosphor sheet 103 is finished, the stimulable phosphor sheet 103 is sent to the final read-out section 140. In this section, a laser beam 302 is produced by a laser beam source 301. The laser beam 302 first passes through a filter 303, which filters out light having wavelengths within the range of the wavelengths of light emitted by the stimulable phosphor sheet 103 upon stimulation thereof by the laser beam 302. Then, the beam diameter of the laser beam 302 is precisely adjusted by a beam expander 304. The laser beam 302 is then deflected by a light deflector 305, which may be formed of a galvanometer mirror, or the like. The laser beam 302 is then caused to impinge upon the stimulable phosphor sheet 103 by a plane reflection mirror 306. Between the light deflector 305 and the plane reflection mirror 306, an $f\theta$ lens 307 is disposed for keeping the beam diameter of the laser beam 302 uniform as it scans the stimulable phosphor sheet 103. While the laser beam 302 impinges upon the stimulable phosphor sheet 103, the stimulable phosphor sheet 103 is moved in the direction indicated by the arrow 308 (i.e. in the sub-scanning direction) by a sheet conveyance means 320, which may be constituted of conveyor rollers, or the like. Consequently, the overall area of the stimulable phosphor sheet 103 is exposed to and scanned by the laser beam 302.

When the stimulable phosphor sheet 103 is exposed to the laser beam 302, it emits light in proportion to the amount of energy stored thereon during its exposure to the radiation. The light emitted enters a light guide member 309, which is made of the same material and has the same configuration as the light guide member 207 used for the preliminary readout. The light emitted by the stimulable phosphor sheet 103 is guided inside of the light guide member 309 through repeated total reflection, emanates from the light output face of the light guide member 309 and is received by a photodetector 310, which may be constituted of a photomultiplier, or the like. The light receiving face of the photodetector 310 is positioned so that it is in close contact with a filter, which selectively transmits only the light having wavelengths within the range of wavelengths of light emitted by the stimulable phosphor sheet 103. Therefore, the photodetector 310 detects only the light emitted by the stimulable phosphor sheet 103.

The output of the photodetector 310, which photoelectrically detects the light emission representing the radiation image stored on the stimulable phosphor sheet 103, is amplified to an appropriate level by an amplifier 311. The gain of the amplifier 311 is adjusted on the basis of the read-out gain setting value (a) determined by the final read-out control means 314. The amplified electric signal is fed into an A/D converter 312, which converts the electric signal into a digital signal by use of a scale factor which is adjusted by the scale factor setting value (b) to suit the width in the fluctuation of the values of the signal. The digital signal thus obtained is fed into a signal processing circuit 313. In the signal processing circuit 313, the digital signal is subjected to signal processing (image processing), the nature of which signal processing is based on the image processing condition setting value (c). After the digital signal is processed, a visible radiation image is obtained which has good image quality and can serve as an effective tool in, particularly, the efficient and accurate diagnosis of an illness.

The processed digital signal is output as a read-out image signal (a final read-out image signal) SO. The final read-out image signal SO generated by the signal processing circuit 313 is fed into a light modulator 401 in the image reproducing section 150. In the image reproducing section 150, a laser beam 403 is produced by a reproducing laser beam source 402. The laser beam 403 is modulated by the light modulator 401 on the basis of the final read-out image signal SO received from the signal processing circuit 313. The laser beam 403 is then made to impinge upon a photosensitive material 405, such as photographic film, by a scanning mirror 404 which causes the laser beam 403 to scan the photosensitive material 405. At this time, the photosensitive material 405 is moved in a direction normal to the aforesaid scanning direction, i.e. in the direction indicated by the arrow 406. Accordingly, the radiation image represented by the final read-out image signal SO is recorded on the photosensitive material 405. In order to reproduce the radiation image, it is possible to use any other appropriate method, such as the aforesaid method using a CRT display device.

How the read-out gain setting value (a), the scale factor setting value (b), and the image processing condition setting value (c) for one of radiation images, which are to be used in finding a change in the state of the same object with the passage of time, are adjusted will hereinbelow be described in detail. FIG. 7 shows the final read-out control means 314, which adjusts the setting values (a), (b), and (c). The final read-out control means 314 may be constituted of, for example, a known computer system.

In this embodiment, by way of example, before a radiation image of an object 101, which image is to be used in finding a change in the state of the same object with the passage of time, is read out from a stimulable phosphor sheet 103, four radiation images of the object 101, which are to be used in finding a change in the state of the same object with the passage of time, were recorded and read out.

As illustrated in FIG. 7, a probability density function creating means 351 of the final read-out control means 314 receives a preliminary read-out image signal SP, which has currently been obtained from a preliminary readout. The probability density function creating means 351 also receives preliminary read-out image signals SP1, SP2, SP3, and SP4, which have been stored in four image files 350A, 350B, 350C, and 350D of an image filing apparatus 340. The preliminary read-out image signals SP1, SP2, SP3, and SP4 represent radiation images of the same object as the object the image of which was stored on the stimulable phosphor sheet 103 currently subjected to the preliminary readout. These radiation images are used in finding a change in the state of the same object with the passage of time.

Figure 8:
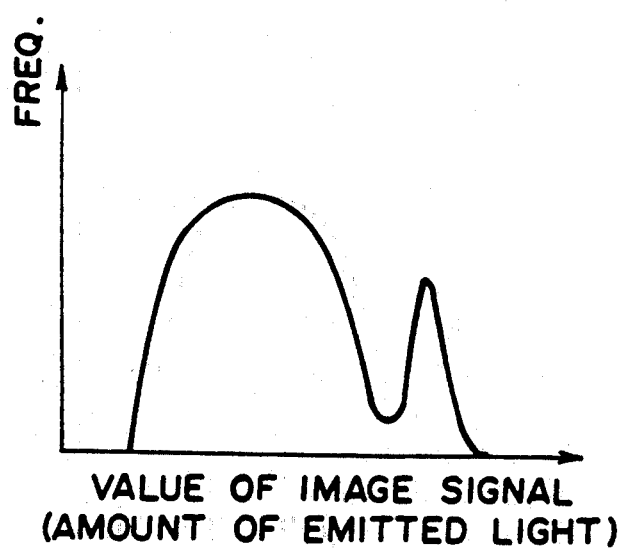
FIG. 8 is a graph showing an embodiment of a probability density function of an image signal.

The probability density function creating means 351 creates the probability density function of all of the preliminary read-out image signals SP, SP1, SP2, SP3, and SP4. By way of example, the probability density function basically has a pattern shown in FIG. 8.

In the probability density function, which has thus been created, the frequency of occurrence of each signal value takes a value approximately five times the frequency of occurrence of the corresponding signal value in a probability density function of only the preliminary read-out image signal SP detected from a single stimulable phosphor sheet 103. In this radiation image read-out and reproducing system, not only the radiation images, which are to be used in finding a change in the state of the same object with the passage of time, are read out, but also a single independent radiation image is read out from a stimulable phosphor sheet 103. Therefore, the probability density function creating means 351 normalizes the probability density function, which has been created in the manner described above, such that it may correspond to a probability density function of a single preliminary read-out image signal SP.

Information H representing the probability density function, which has been created in the manner described above, is fed into a probability density function analyzing means 352. The probability density function analyzing means 352 calculates the maximum value of the signal, the minimum value of the signal, the signal value which occurs most frequently, i.e. the signal value corresponding to the maximum value of the probability density function, or the like, and feeds information Sr representing the calculated values into a reading means 353. A storage means 354 stores information representing the read-out gain setting value (a), the scale factor setting value (b), and the image processing condition setting value (c), which are suitable for the aforesaid maximum value, the minimum value, the signal value which occurs most frequently, or the like. The reading means 353 reads the pieces of the information representing the setting values (a), (b) and (c), which correspond to the information Sr, from the storage means 354. The reading means 353 then feeds these pieces of the information respectively into the amplifier 311, the A/D converter 312, and the signal processing circuit 313.

The setting values (a), (b), and (c) are adjusted in the manner described above. Therefore, the setting values (a), (b), and (c) can be determined which are optimal for the radiation image currently stored on the stimulable phosphor sheet 103.

Also, when the setting values (a), (b), and (c) are determined, the characteristics of the image input information on the four stimulable phosphor sheets, on which the radiation images were stored in the past, are taken into consideration. Therefore, the setting values (a), (b), and (c) thus determined become close to those which were employed when the radiation images to be used in finding a change in the state of the same object with the passage of time were reproduced as visible images. Accordingly, a large amount of variation in image density does not occur between the visible radiation image, which is to be used in finding a change in the state of the same object with the passage of time and which is reproduced currently on the photosensitive material 405, and the visible radiation images, which are to be used in finding a change in the state of the same object with the passage of time and which were reproduced in the past.

Additionally, when the setting values (a), (b), and (c) are determined, the characteristics of the image input information on the stimulable phosphor sheet 103, from which the preliminary readout is carried out currently, are taken into consideration. Therefore, unlike the cases where the setting values (a), (b), and (c) are fixed for the same object, a large amount of variation in image density does not occur between the visible radiation images even if the image recording conditions, under which the current radiation image was recorded on the stimulable phosphor sheet 103, are different from the image recording conditions, under which the past radiation images of the same object were recorded.

In cases where a composite probability density function of a plurality of preliminary read-out image signals SP, SP, . . . detected from a plurality of images is created in the manner described above, when the frequencies of occurrence of a certain signal value corresponding to the images are F1, F2, F3, . . . , Fn in the order of the image recording operations, the frequencies of occurrence of the signal value corresponding to the images may be weighted. A composite frequency of occurrence, F, of the signal value may then be calculated from the formula $$F = k1F1 + k2F2 + k3F3 \ldots + knFn$$

where each of k1, k2, k3, ..., kn represents a weight factor. In such cases, in order to cope with the change in the image recording conditions, or the like, a larger weight factor may be given to the signal value for a more recently recorded image, i.e.

$$k < k2 < k3 < \ldots < kn$$

In the aforesaid embodiment of the method for setting read-out conditions and/or image processing conditions for a radiation image in accordance with the present invention, the characteristics of the image input information on all of the plurality of the stimulable phosphor sheets, on which the image recording and read-out operations were carried out for the same object in the past, are utilized in setting the read-out conditions for the final readout and/or the image processing conditions with respect to the radiation image stored on the stimulable phosphor sheet 103, from which the image read-out operation is carried out currently. Alternatively, only the characteristics of the image input information on some of the plurality of the stimulable phosphor sheets may be utilized in setting the read-out conditions for the final readout and/or the image processing conditions with respect to the radiation image stored on the stimulable phosphor sheet 103, from which the image read-out operation is carried out currently. This also applies to an embodiment described below.

A different example of a final read-out control means 314, which may be employed in the method for setting read-out conditions and/or image processing conditions for a radiation image in accordance with the present invention, will be described hereinbelow with reference to FIG. 9. The final read-out control means 314 shown in FIG. 9 is provided with a neural network 360 in lieu of the probability density function analyzing means 352, the reading means 353, and the storage means 354 shown in FIG. 7. The neural network 360 is constituted of a computer system.

The neural network 360 is provided with a learning function by back propagation method. Specifically, when information (an instructor signal), which represents whether an output signal obtained when an input signal is given is or is not correct, is fed into the neural network, the weight of connections between units in the neural network (i.e. the weight of synapse connections) is corrected. By repeating the learning of the neural network, the probability that a correct answer will be obtained in response to a new input signal can be kept high. (Such functions are described in, for example, "Learning representations by back-propagating errors" by D. E. Rumelhart, G. E. Hinton and R. J. Williams, Nature, 323-9,533-356, 1986a; "Back-propagation" by Hideki Aso, Computrol, No. 24, pp. 53-60; and "Neural Computer" by Kazuyuki Aihara, the publishing bureau of Tokyo Denki University).

In this embodiment, the neural network 360 receives the information H representing the probability density function of the preliminary read-out image signals SP, SP, ... obtained from five stimulable phosphor sheets 103, 103, ... In accordance with the information H, the neural network 360 feeds out information representing an appropriate read-out gain setting value (a), an appropriate scale factor setting value (b), and an appropriate image processing condition setting value (c).

In this embodiment, the read-out gain setting value (a), the scale factor setting value (b), and the image processing condition setting value (c) are determined on the basis of all of the characteristics of the image input information on the stimulable phosphor sheet 103, from which the preliminary readout is currently carried out, and the characteristics of the image input information on the four stimulable phosphor sheets, from which image read-out operations were carried out in the past. Accordingly, a large amount of variation in image density does not occur between the visible radiation image, which is to be used in finding a change in the state of the same object with the passage of time and which is reproduced currently on the photosensitive material 405, and the visible radiation images, which are to be used in finding a change in the state of the same object with the passage of time and which were reproduced in the past.

Figure 10:
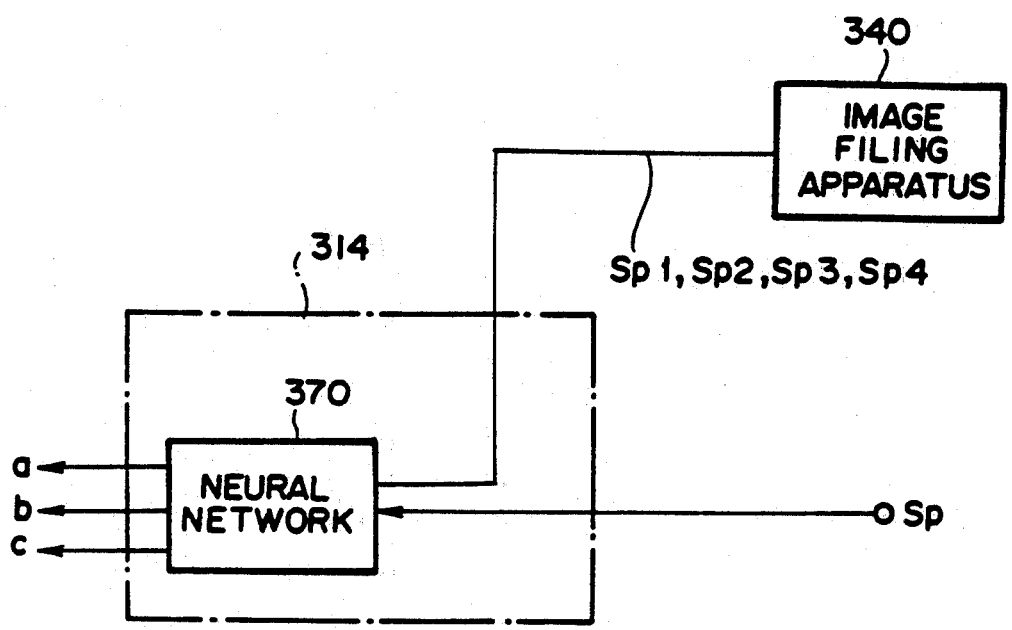
FIG. 10 is a block diagram showing a further different example of a means for setting read-out conditions and/or image processing conditions for a radiation image.

A further different example of a final read-out control means 314, which may be employed in the method for setting read-out conditions and/or image processing conditions for a radiation image in accordance with the present invention, will be described hereinbelow with reference to FIG. 10. The final read-out control means 314 shown in FIG. 10 is provided with a neural network 370 in lieu of the probability density function creating means 351, the probability density function analyzing means 352, the reading means 353, and the storage means 354 shown in FIG. 7.

The neural network 370 receives the image signal components of the preliminary read-out image signals SP, SP, ... which represent picture elements in the radiation images stored on five stimulable phosphor sheets 103, 103, ... In accordance with the received signals, the neural network 360 feeds out information representing an appropriate read-out gain setting value (a), an appropriate scale factor setting value (b), and an appropriate image processing condition setting value (c). A neural network for determining the read-out conditions for the final readout and/or the image processing conditions on the basis of a preliminary read-out image signal SP is described in detail in, for example, Japanese Patent Application No. 2(1990)-151040.

In this embodiment, the read-out gain setting value (a), the scale factor setting value (b), and the image processing condition setting value (c) are determined on the basis of all of the characteristics of the image input information on the stimulable phosphor sheet 103, from which the preliminary readout is currently carried out, and the characteristics of the image input information on the four stimulable phosphor sheets, from which image read-out operations were carried out in the past. Accordingly, a large amount of variation in image density does not occur between the visible radiation image, which is to be used in finding a change in the state of the same object with the passage of time and which is reproduced currently on the photosensitive material 405, and the visible radiation images, which are to be used in finding a change in the state of the same object with the passage of time and which were reproduced in the past.

In the radiation image read-out and reproducing system of FIG. 5, the final read-out section and the preliminary read-out section are independent and separate from each other. Alternatively, as disclosed in, for example, U.S. Pat. No. 4,527,060, a single read-out section may be utilized in common to carry out both the preliminary readout and the final readout. In such cases, after the preliminary readout from a stimulable phosphor sheet is finished, the stimulable phosphor sheet is returned by a sheet conveyance means to the read-out section. The final readout is then carried out. During the preliminary readout, the stimulation energy of stimulating rays may be set by a stimulation energy adjusting means to a level lower than that employed during the final readout. The method for setting read-out conditions and/or image processing conditions for a radiation image in accordance with the present invention is also applicable in such cases.

In the aforesaid embodiment of the method for setting read-out conditions and/or image processing conditions for a radiation image in accordance with the present invention, the read-out conditions for the final readout and the image processing conditions are set with the method in accordance with the present invention. Alternatively, a final readout may be carried out under predetermined read-out conditions regardless of the characteristics of a preliminary read-out image signal SP, and the image processing conditions, under which image processing is to be carried out on an image signal SO, may be determined on the basis of the preliminary read-out image signal SP. As another alternative, the image processing conditions may be fixed, and only the read-out conditions for the final readout may be set with the method in accordance with the present invention.

Figure 11:
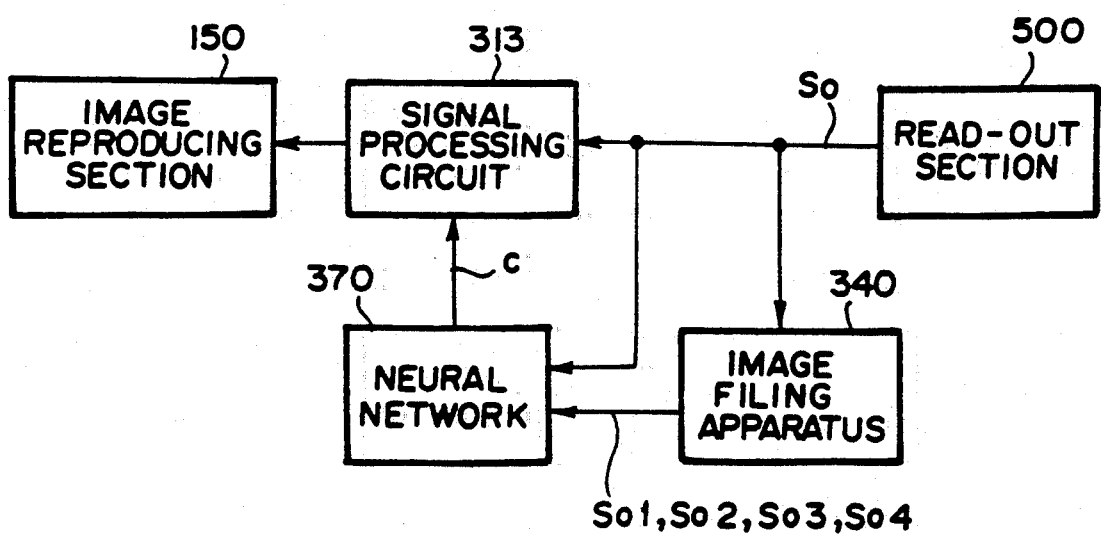
FIG. 11 is a block diagram showing a different example of a radiation image read-out and reproducing system, wherein an embodiment of the method for setting read-out conditions and/or image processing conditions for a radiation image in accordance with the present invention is employed.

Also, in the aforesaid embodiment of the method for setting read-out conditions and/or image processing conditions for a radiation image in accordance with the present invention, a preliminary readout is carried out. The method for setting read-out conditions and/or image processing conditions for a radiation image in accordance with the present invention is also applicable when a preliminary readout is not carried out, but only a final readout is carried out. FIG. 11 shows such a radiation image read-out and reproducing system.

With reference to FIG. 11, a read-out section 500 is basically constituted in the same manner as that in the final read-out section 140 of FIG. 5. In the read-out section 500, a radiation image is read out from a stimulable phosphor sheet. An image signal SO obtained thereby is subjected to image processing in the signal processing circuit 313. The image signal SO, which has been obtained from the image processing, is sent to the image reproducing section 150 constituted in the same manner as that shown in FIG. 5. In the image reproducing section 150, a visible image is reproduced from the image signal SO.

The image processing conditions are set on the basis of the image processing condition setting value (c), which has been determined by the neural network 370. In order to determine the image processing condition setting value (c), the same means as that shown in FIG. 10 is employed. Alternatively, the means shown in FIG. 7 or FIG. 9 may be employed for this purpose.

When a radiation image other than radiation images, which are to be used in finding a change in the state of the same object with the passage of time, is to be reproduced, the neural network 370 determines the image processing condition setting value (c) on the basis of only the image signal SO.

In cases where radiation images of a certain object, which are to be used in finding a change in the state of the same object with the passage of time, are to be read out and reproduced, image signals SO1, SO2, SO3, and SO4 corresponding to said object, which were obtained in the past from the read-out section 500 and stored in the image filing apparatus 340, are read from the image filing apparatus 340. The image signals SO1, SO2, SO3, and SO4 are fed into the neural network 370 together with the image signal SO. The neural network 370 determines the image processing condition setting value (c) on the basis of all of the image signals SO1, SO2, SO3, SO4, and SO.

In this embodiment, the image processing condition setting value (c) is determined on the basis of all of the characteristics of the image input information on the stimulable phosphor sheet 103, from which the preliminary readout is currently carried out, and the characteristics of the image input information on the four stimulable phosphor sheets, from which image read-out operations were carried out in the past. Accordingly, a large amount of variation in image density does not occur between the visible radiation image, which is to be used in finding a change in the state of the same object with the passage of time and which is reproduced currently, and the visible radiation images, which are to be used in finding a change in the state of the same object with the passage of time and which were reproduced in the past.

When the image processing conditions for the image signal SO are set on the basis of the image signal SO, the recording medium used is not limited to a stimulable phosphor sheet. Specifically, the read-out section 500 of FIG. 11 may be replaced by, for example, a means for reading out a radiation image from a sheet of silver halide photographic film or a storage means, such as an optical disk, for storing an image signal representing a radiation image. The method for setting read-out conditions and/or image processing conditions for a radiation image in accordance with the present invention is also applicable in such cases.

We claim:

1. In a radiation image recording, read-out, and reproducing system for:
   i) carrying out a radiation image recording operation, wherein radiation is irradiated to an object, and a stimulable phosphor sheet is exposed to the radiation, which has passed through the object, a radiation image of the object being thereby stored on the stimulable phosphor sheet,
   ii) carrying out an image read-out operation, wherein:
   a first image signal representing the radiation image of the object is obtained from a preliminary readout for exposing the stimulable phosphor sheet, on which the radiation image has been stored, to stimulating rays, which cause the stimulable phosphor sheet to emit light in proportion to the amount of energy stored thereon during its exposure to radiation, the emitted light being detected, and
   a second image signal representing the radiation image is thereafter obtained from a final readout for again exposing the stimulable phosphor sheet to stimulating rays, the light emitted by the stimulable phosphor sheet being detected,
   read-out conditions for the final read-out being adjusted on the basis of the first image signal,
   iii) when necessary, carrying out image processing on the second image signal, which has been obtained from the final readout, and
   iv) reproducing a visible image from the second image signal, which has been or has not been image processed,
   a method for adjusting conditions, in which image recording conditions for the radiation image recording operation and the read-out conditions for the final read-out are adjusted, the method for adjusting conditions comprising the steps of:

a) storing information representing the image recording conditions, under which radiation image recording operations were carried out in the past, information giving specifics about the corresponding objects, for which the radiation image recording operations were carried out, and information representing the corresponding read-out conditions for final read-outs in image read-out operations carried out in the past, these pieces of information being stored in a storage means.

b) when a radiation image recording operation and an image read-out operation are to be carried out for a specific object, investigating whether a radiation image recording operation and an image read-out operation were or were not carried out in the past for the same object as said specified object, and c) in cases where a radiation image recording operation and an image read-out operation were carried out in the past for the same object as said specific object, adjusting image recording conditions for said specific object such that the conditions coincide with the image recording conditions under which the radiation image recording operation was carried out for the same object as said specific object, adjusting the read-out conditions for the final read-out, which is to be carried out for said specific object, such that the conditions coincide with the read-out conditions under which the final readout was carried out in the past for the same object as said specific object, the read-out conditions being obtained from the information stored in said storing step, and carrying out a radiation image recording operation and an image read-out operation for said specific object under the conditions, which have thus been adjusted.

2. A method for adjusting conditions as defined in claim 1 wherein said storage means collectively stores the information with respect to a plurality of objects.

3. A method for adjusting conditions as defined in claim 1 wherein said information giving specifics about the corresponding objects includes information representing the name of objects and the information representing the portions of the objects the image of which were recorded, and said storage means is composed of a plurality of independent and different storage media, which are prepared for different names of the objects.

4. A method for adjusting conditions as defined in claim 1 wherein said stimulating rays are a laser beam.

5. In a radiation image recording, read-out, and reproducing system for:

i) carrying out a radiation image recording operation, wherein radiation is irradiated to an object, and a recording medium is exposed to the radiation, which has passed through the object, a radiation image of the object being thereby recorded on the recording medium, ii) carrying out an image read-out operation, wherein the radiation image, which has been recorded on the recording medium, is photoelectrically read-out, and an image signal representing the radiation image of the object is thereby obtained, the image signal being made up of a series of image signal components, iii) carrying out a normalizing operation, wherein only image signal components representing desired image information are extracted from the image signal, which has been obtained from the image read-out operation, normalizing conditions for the normalizing operation being adjusted on the basis of the image signal, which has been obtained from the image read-out operation, iv) when necessary, carrying out image processing on the image signal components, which have been obtained from the normalizing operation, and v) reproducing a visible image from the image signal components, which have been or have not been image processed, a method for adjusting conditions, in which image recording conditions for the radiation image recording operation and the normalizing conditions for the normalizing operation are adjusted, the method for adjusting conditions comprising the steps of:

a) storing information representing the image recording conditions, under which radiation image recording operations were carried out in the past, information giving specifics about the corresponding objects, for which the radiation image recording operations were carried out, and information representing the corresponding normalizing conditions for normalizing operations carried out in the past, these pieces of information being stored in a storage means, b) when a radiation image recording operation, an image read-out operation, and a normalizing operation are to be carried out for a specific object, investigating whether a radiation image recording operation, an image read-out operation, and a normalizing operation were or were not carried out in the past for the same object as said specific object, and c) in cases where a radiation image recording operation, an image read-out operation, and a normalizing operation were carried out in the past for the same object as said specific object, adjusting image recording conditions for said specific object such that the conditions coincide with the image recording conditions under which the radiation image recording operation was carried out for the same object as said specific object, adjusting the normalizing conditions for the normalizing operation, which is to be carried out for said specific object, such that the conditions coincide with the normalizing conditions under which the normalizing operation was carried out in the past on the image signal representing the radiation image of the same object as said specific object, and carrying out a radiation image recording operation, an image read-out operation, and an normalizing operation for said specific object under the conditions, which have thus been adjusted.

6. A method for adjusting conditions as defined in claim 5 wherein said storage means collectively stores the information with respect to a plurality of objects.

7. A method for adjusting conditions as defined in claim 5 wherein said information giving specifics about the corresponding objects includes information representing the names of objects and the information representing the portions of the objects the images of which were recorded, and said storage means is composed of a plurality of independent and different storage media, which are prepared for different names of the objects.

8. A method for adjusting conditions as defined in claim 5 wherein said recording medium is a stimulable phosphor sheet.

9. A method for adjusting conditions as defined in claim 8 wherein said image signal is obtained by exposing said stimulable phosphor sheet to stimulating rays, which cause said stimulable phosphor sheet to emit light in proportion to the amount of energy stored thereon during its exposure to radiation, and photoelectrically detecting the emitted light.

10. A method for adjusting conditions as defined in claim 9 wherein said stimulating rays are a laser beam.

11. A method for adjusting conditions as defined in claim 5 wherein said recording medium is photographic film.

12. A method for setting read-out conditions and/or image processing conditions for a radiation image, wherein:
before a final readout is carried out in which a stimulable phosphor sheet having a radiation image stored thereon is exposed to stimulating rays, which cause the stimulable phosphor sheet to emit light in proportion to the amount of energy stored thereon during its exposure to radiation, the emitted light being detected by a photoelectric read-out means, and an image signal is thereby obtained from which a visible image is to be reproduced,
a preliminary readout is carried out by using stimulating rays having an energy level lower than the energy level of the stimulating rays used in the final readout, and
read-out conditions for the final readout and/or image processing conditions are set on the basis of characteristics of image input information on the stimulable phosphor sheet, which image input information has been obtained from the preliminary readout,
wherein the improvement comprises the steps of:
i) carrying out preliminary readouts from all of a plurality of stimulable phosphor sheets, on each of which stimulable phosphor sheets one radiation image of the same object has been stored, said radiation images being used in finding a change in the state of the same object with the passage of time, and ii) for each of the plurality of said stimulable phosphor sheets, setting read-out conditions for the final readout and/or image processing conditions on the basis of characteristics of image input information on each said stimulable phosphor sheet and characteristics of image input information on at least one stimulable phosphor sheet, on which a radiation image was stored before a radiation image was stored on each said stimulable phosphor sheet.

13. A method for setting read-out conditions and/or image processing conditions for a radiation image as defined in claim 12 wherein said stimulating rays are a laser beam.

14. A method for setting image processing conditions, wherein conditions, under which image processing is carried out on an image signal representing a radiation image, are set,
the method for setting image processing conditions comprising the steps of:
in cases where a plurality of image signals are obtained, said image signals representing radiation images of the same object, which radiation images are to be used in finding a change in the state of the same object with the passage of time,
for each of the plurality of said image signals, setting image processing conditions on the basis of each said image signal and at least one image signal representing a radiation image, which was recorded before a radiation image represented by each said image signal was recorded.

15. A method for setting image processing conditions as defined in claim 14 wherein said radiation image has been stored on a stimulable phosphor sheet.

16. A method for setting image processing conditions as defined in claim 15 wherein said image signal is obtained by exposing said stimulable phosphor sheet to stimulating rays, which cause said stimulable phosphor sheet to emit light in proportion to the amount of energy stored thereon during its exposure to radiation, and photoelectrically detecting the emitted light.

17. A method for setting image processing conditions as defined in claim 16 wherein said stimulating rays are a laser beam.

18. A method for setting image processing conditions as defined in claim 14 wherein said radiation image has been recorded on photographic film.

* * * * *